3,265,669
LIQUID AMINE HARDENER COMPOSITIONS FOR POLYURETHANE RESINS

Frank N. Hirosawa, Los Angeles, Calif., assignor to Furane Plastics Incorporated, Los Angeles, Calif., a corporation of California
No Drawing. Filed Aug. 19, 1963, Ser. No. 303,170
7 Claims. (Cl. 260—77.5)

This invention relates to hardener compositions in liquid form for use as co-reactants in the production of cured urethane resins. More particularly, it relates to the preparation of high molecular weight urethane polymers by reaction of isocyanates with organic nitrogen compounds.

Polyurethane polymers, particularly elastomers, are useful because of their unique properties, such as high strength and elasticity, good load-bearing capacity and resilience, high tear strength, resistance to oils, oxygen and ozone, good low temperature properties, and exceptional abrasion resistance. Polyurethane polymers are formed by reacting a di- or poly-functional isocyanate with polyether polyols or with hydroxy-terminated polyesters.

In reacting monoisocyanate with a compound containing a simple reactive hydrogen, a single urethane is formed; if the two reactants are bifunctional, the resulting product is polymeric; and if one of the reactants is polymeric, the ultimate product will be a polymer of high molecular weight. Such a compound with reactive isocyanate-terminated polymers that may be further chain extended, cross-linked, cured or hardened to high molecular weight compounds is represented, typically, in the following equation:

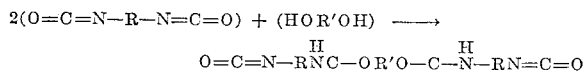

The isocyanate-terminated reactive intermediate reaction product is known in industry as (1) an isocyanate terminated prepolymer, or (2) a polyurethane prepolymer, or (3) a polyisocyanate prepolymer. The prepolymer which contains an excess of unreacted isocyanate groups may be subsequently chain extended, cross-linked or cured by reaction with an arylene diamine, producing linkage of the substituted urea type as for example in the following equation:

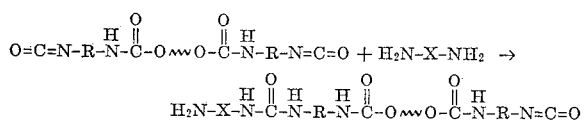

The reaction of the type shown above has been employed in the preparation of the polyisocyanate prepolymer, which has a viscosity range from several hundred centipoises to viscous syrupy materials.

The reaction of isocyanate with compounds that contain nitrogen hydrogen bonds has been found to be governed primarily by the basicity or nucleophilicity of the nitrogen-hydrogen bond, and the basicity of aromatic amines is decreased when electronegative groups, such as halogen atoms or nitro groups are introduced into the nucleus, especially ortho-standing groups exert the greatest effect. It is generally recognized that arylamine cured elastomers will have higher modulus, increased tensile strength, better tear strength, greater solvent resistance, and usually require much shorter cure time than glycol cured elastomers.

The reactivities of the aryl diamines and of the amines which are currently used as urethane curatives, such as 4,4′ - methylene bis(2-chloroaniline); methylene bis(2-methylaniline); methylene bis(2-methoxyaniline); poly-methylene polyaniline; tolidine; dianisidine; 3,3′-dichlorobenzidine; and the like, are related to the nuclear substituents.

In spite of the superiority of the aryl diamines (for example, 4,4′-methylene bis(2-chloroaniline) and 3,3′-dichlorobenzidine) as curing agents for urethane resins, wherein good physical properties and longer working life of the final polymers are attained, the use of these materials is attended with certain disadvantages that have limited more widespread acceptance. Specifically, these substances have relatively high melting points, making it difficult to get a uniform mix. The initial mixing is sometimes effected by powdering the curing agent, but even then, due to the elevated melting point, it must be melted and further uniformly dispersed in the polyisocyanate prepolymer, which it is intended to cure. This heating shortens the working life considerably and at times sets the mixture to an insoluble, infusible polymer before it can be mixed properly.

The principal object of the present invention is to provide a curing agent in liquid form for easy uniform mixing with the polyisocyanate prepolymer, which results in optimum properties when cured at the ambient room temperature. Another objective is to provide a liquid curing composition that can be used as a hardener, cross-linking agent or chain extender for polyisocyanate prepolymers, at ambient room temperature or by the application of slight heat.

Another objective is to provide a liquid curing agent that can be compounded with conventional compounding ingredients such as carbon black, silica, or coloring ingredients, and be subsequently mixed with polyisocyanate prepolymers to form highly useful polyurethane elastomers.

I have discovered that by dissolving the aryl amines in certain solvents, a new room temperature liquid curing hardener is provided, which not only produces the desired final physical properties, but also may give a reduction in viscosity and a lengthening of the working life of the hardener-polyisocyanate mixture. The working life is considerably longer than is possible with the use of the conventional dry powder curing agents such as Moca, etc.

In particular, I have discovered that new and useful urethane hardening agents in liquid form may be prepared by dissolving appropriate amine compounds in N-substituted 2-pyrrolidone of the structure

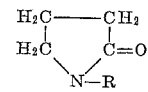

where R is a substituent of the class consisting of a simple or substituted alkyl, alicyclic, aralkyl, alkaryl or aryl groups. While R may be in the range of $C_1$ to $C_{20}$, the most convenient and preferred substituent is methyl; other substituents such as ethyl, propyl, butyl and vinyl may be used for preparation of non-crystallizing liquid amine hardeners.

The ratio of amines to N-substituted 2-pyrrolidone is selected so that the desired viscosity of the hardener mix may be obtained, limited by the amount of the pyrrolidone which can be tolerated in the final product. The preferred ratio is in the range of 10 to 90 percent by weight of selected amine to N-substituted 2-pyrrolidone, based upon the final mixture.

For the preparation of such liquid hardener compositions, the appropriate amine is mixed with N-substituted 2-pyrrolidone, and the mixture heated enough to complete the solution in a dry atmosphere, at a temperature ranging from about 20° C. to about 150° C.

This invention is illustrated by reference to the following typical examples, although the invention is not limited to these examples. Parts are by weight unless otherwise indicated.

Example I

A preferred hardening agent in accordance with my invention consists of 50 parts of dry N-methyl-2-pyrrolidone and 50 parts of dry 4,4'-methylene bis(2-chloroaniline). These were introduced into a closed vessel, and the mixture was stirred and gradually heated to about 100° C., and the heating continued until a clear solution was obtained. The contents of the vessel was then cooled down to room temperature and stored in a sealed container in a dry atmosphere, to avoid excessive moisture pickup.

The liquid curing agent obtained in the manner described had a viscosity of 100 cps. and did not crystallize upon cooling to room temperature. When tested after two weeks, in a 150° F. air circulating oven, the material remained stable, retaining its fluidity and curing properties.

Example II

The liquid curing agent prepared as illustrated above may be admixed with a polyisocyanate prepolymer and the mass allowed to cure at room temperature to obtain a resilient, tough rubber-like elastomer.

The liquid polyisocyanate prepolymer used above with my new liquid curing agent consisted preferably of the reaction product of polypropylene ether triol and a 80/20 mixture of 2,4- and 2,6-tolylene diisocyanate in the proportion of one to three.

Other, suitable polyols may similarly be employed, and among these are: polyethylene ether glycol of the approximate molecular weight range of 200 to 4000; polypropylene ether glycol with a molecular weight range of 200 to 4000; varying molecular weight hydroxy terminated polyesters, such as ethylene adipate, propylene adipate, ethylene sebacate, and the like; suitable polyisocyanates may similarly be employed and examples of these are: m-phenylene diisocyanate; hexamethylene diisocyanate, 2,4-tolylene diisocyanate; 3,3'-dimethyl-4,4'-biphenylene diisocyanate; and the like.

In some mixtures the chain growth does not proceed smoothly at ambient room temperature and some heat is required to obtain optimum physical properties. In some cases, it is desirable to add small but sufficient amounts of an accelerator or catalyst to facilitate a room or low temperature cure, such catalysts including organic metal salts, such as lead naphthenate, lead octoate, copper naphthenate, manganese naphthenate, cobalt naphthenate, and equivalent materials.

Example III

The curing agent of this invention is particularly suited for chain-extending, cross-linking or curing polyisocyanate prepolymers that are low in viscosity at room temperature, such as those having amine equivalents of 600–2000. For each 100 parts of polyisocyanate prepolymer having an amine equivalent of 630, 42 parts of the curing agent prepared in Example I are used, and the mixture was cured at room temperature for 4 days to obtain a urethane elastomer having tensile strength of 2,500 p.s.i. and elongation of 420 percent.

Example IV

When 3,3'-dichlorobenzidine is substituted for 4,4'-methylene bis(2-chloroaniline) as in Example I, a low viscosity hardening agent having an equivalent weight of 253 was obtained. Forty parts of this hardener was mixed thoroughly with 100 parts of prepolymer (amine equivalent 630) and a mixture was obtained that had a pourable working life of 2 hours at 80° F. compared to an equivalent cure prepared from dry powdered 3,3'-dichlorobenzidine, had a working life of 7 minutes at 190° F., and both samples showed comparable physical properties after 5 days cure at room temperature.

Example V

Proceeding as in Example I, and substituting N-vinyl-2-pyrrolidone for the N-methyl-2-pyrrolidone a low viscosity liquid hardener was obtained. Thirty-three parts of this curing agent was mixed with 100 parts of prepolymer (amine equivalent of 630), obtaining a mixture that had a pourable working life of 1 hour and 30 minutes at 80° F. A polyurethane elastomer was thus obtained having physical properties comparable with samples cured as described in Example I.

Example VI

Two thousand parts of 4,4'-methylene bis(2-chloroaniline), 600 parts of 3,3'-dichlorobenzidine, 1300 parts of N-methyl-2-pyrrolidone, and 300 parts of N-vinyl-2-pyrrolidone was placed in a 5 liter three neck Pyrex flask equipped with thermometer, stainless steel paddle stirrer, "Glas-col" heating mantle and an inert gas inlet. While the vessel was being flushed with inert gas (oil pumped dry nitrogen) and the mixture stirred, heat was applied until a temperature of 100° C. was reached. The reaction mass was heated at 100° C. until a clear solution was obtained. The product was then cooled to room temperature and stored in a sealed container to avoid excessive moisture pickup.

The liquid hardener thus produced had the following properties:

Viscosity (Brookfield viscometer) at 25° C., cps.____ 176
Color (Gardner-Holdt) _____ 16
Amine equivalent _____ 213

34 parts of the above hardener and 100 parts of polyisocyanate prepolymer, prepared from polypropylene triol adduct of 80/20 isomer mixture of tolylene diisocyanate (in the ratio of one to three) was mixed thoroughly and cured at room temperature for 7 days. Following typical physical properties were obtained:

|  | R. T. Cure | Post Cure, 3 hrs. at 150° F. |
| --- | --- | --- |
| Tensile Strength, p.s.i. | 1,500 | 2,400 |
| Elongation, percent | 600 | 450 |
| Hardness, Shore A | 75 | 80 |

Sometimes a higher viscosity liquid hardener is required. This may be effected by the addition of 1 to 20 percent by weight of any polyisocyanate prepolymer to the prepared liquid hardener.

The viscosity of the liquid hardener prepared Example VI may be controlled by further reacting the liquid hardener with a selected molecular weight prepolymer with an amine equivalent of 50–1000. The ratio of prepolymer to liquid amine hardener is selected to give the desired viscosity while avoiding the tie up of all of the potentially available reactive hydrogen groups, which are required to be available to initiate the curing reaction when the hardener is subsequently mixed with the polyisocyanate prepolymer, as in Example VII.

Example VII

Proceeding as in Example VI, the liquid amine hardener was further reacted by the slow addition of 200 parts (based on Example IV reaction ratio) of polyisocyanate prepolymer (amine equivalent of 630). In addition, the temperature was raised to 130° C. during a period of one hour. The product was then cooled to room temperature and stored in a sealed container. The liquid hardener thus obtained had the following physical properties:

Viscosity @ 25° C., cps. _____ 380
Gardner color _____ 16
Amine equivalent _____ 215

Comparative physical properties of the urethane elastomers cured with the above prepared liquid amine hardener and the conventional powder curing system are tabulated in the following table:

| Polyisocyanate Prepolymer | Eq. Wt. | Curing Agent | Amount, P.B.W. | Pot Life | Hardness Shore A | Tensile Strength, p.s.i. | Elongation, percent |
|---|---|---|---|---|---|---|---|
| Polypropylenetriol | 650 | A¹ | 34 | 1.5 hr. at 80° F. | 80 | 1,900 | 440 |
|  |  | MOCA² | 20 | 10 min. at 150° F. | 85 | 2,500 | 400 |
| Polyester Ethylene-adipate type | 1,400 | A¹ | ---------- | 3 hrs. at 80° F. | 90 | 2,650 | 500 |
|  |  | MOCA² | ---------- | 30 min. at 150° F. | 90 | 2,500 | 400 |
| Poly(oxytetromethylene)-glycol | 650 | A¹ | 32 | 3 hrs. at 80° F. | 90 | 6,350 | 580 |
|  |  | MOCA² | 20 | 15 min. at 150° F. | 95 | 3,980 | 425 |

¹ Liquid amine hardener prepared as in Example VII.
² 4,4′-methylene bis-(2-chloroaniline) prepolymer was heated to 150° F. and molten curing agent was added at 150° F.

Conventional compounding ingredients such as carbon black, silica, pigments and other modifying fillers, are readily dispersed with the resin-forming materials prior to the curing, because of the relatively low viscosity of the mixture prior to curing.

The advantages of the new liquid amine hardener will be understood from the above description. The curing is exceedingly simple, and the physical properties of the final product obtained are equivalent or superior to the presently used powder curing system.

I claim:
1. A liquid room temperature curing agent for production of a thermosetting rubber-like composition from polyurethane prepolymers comprising an aromatic diamine having two active nitrogen-hydrogen bonds, dissolved in a N-substituted 2-pyrrolidone having the structure

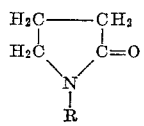

where R is a member of the group consisting of a lower alkyl and a vinyl group.

2. The liquid curing agent defined in claim 1 in which the substituent R is a vinyl group.

3. The liquid curing agent defined in claim 1 in which the aromatic polyamine curative is an aryl diamine.

4. The liquid curing agent defined in claim 1 in which the aromatic polyamine curative is selected from the group consisting of 4,4′-methylene bis(2-chloroaniline); methylene bis(2-methylaniline); methylene bis(2-methoxyaniline); polymethylene polyaniline; tolidine; dianisidine and 3,3′-dichlorbenzidine.

5. The liquid curing agent defined in claim 1 in which the aromatic polyamine curative is 4,4′-methylene bis(2-chloroaniline) and the pyrrolidone is N-methyl-2-pyrrolidone.

6. The liquid curing agent defined in claim 1 in which the aromatic polyamine curative is 3,3′-dichlorobenzidine and the pyrrolidone is N-methyl-2-pyrrolidone.

7. The method of curing a polyurethane prepolymer to form a thermosetting rubber-like composition which consists of the steps of pre-dissolving the urethane curing agent defined in claim 1 in N-substituted 2-pyrrolidone by gentle heating until a clear solution is obtained, uniformly mixing said curing solution with said polyurethane prepolymer in proportions in the range from 1 to 9 and 9 to 1, and holding said mixture at substantially room temperatures until cured, wherein said urethane curing agent is an aryl diamine.

References Cited by the Examiner

UNITED STATES PATENTS

| | | | |
|---|---|---|---|
| 2,917,489 | 12/1959 | Gladding | 250—77.5 |
| 2,929,800 | 3/1960 | Hill | 260—77.5 |
| 2,957,852 | 9/1960 | Frankenburg | 260—77.5 |
| 2,957,872 | 10/1960 | Frankenbugg | 260—77.5 |
| 3,004,945 | 10/1961 | Farago | 260—30.2 |
| 3,038,876 | 1/1962 | Farago | 260—30.2 |
| 3,162,429 | 1/1965 | Wich | 260—30.2 |
| 3,166,429 | 1/1965 | Wich | 260—20.2 |
| 3,216,983 | 11/1965 | Shelanski et al. | 260—77.5 |

LEON J. BERCOVITZ, *Primary Examiner.*

M. C. JACOBS, *Assistant Examiner.*